United States Patent [19]

Matter

[11] 4,237,205

[45] Dec. 2, 1980

[54] POCKET GRID FOR ALKALINE BATTERY PLATES

[75] Inventor: Robert C. Matter, Anderson, Ind.

[73] Assignee: General Motors Corporation, Detroit, Mich.

[21] Appl. No.: 86,737

[22] Filed: Oct. 22, 1979

[51] Int. Cl.$^3$ .............................................. H01M 4/72
[52] U.S. Cl. .................................... 429/234; 429/241
[58] Field of Search ................................ 429/234, 241

[56] References Cited

U.S. PATENT DOCUMENTS

| | | | |
|---|---|---|---|
| 3,247,023 | 4/1966 | Geissbauer | 429/234 X |
| 3,453,145 | 7/1969 | Duddy | 429/244 |
| 4,091,192 | 5/1978 | Scholle | 429/234 X |
| 4,118,553 | 10/1978 | Buckethal et al. | 429/234 |
| 4,121,023 | 10/1978 | Parkinson et al. | 429/234 X |

*Primary Examiner*—Charles F. LeFevour
*Attorney, Agent, or Firm*—Lawrence B. Plant

[57] ABSTRACT

A laminated alkaline battery grid has two thermoplastic outer gridwire network layers and a thermoplastic inner gridwise network layer sandwiched between the outer layers. A plurality of elongated intersecting welds extend as narrow channels in criss-cross fashion across the faces of the grid and bond the networks together. The channels are defined by walls formed by the fusion and exudation of the thermoplastic from the networks during welding and serve to divide the networks into a plurality of substantially symmetrical gridwire pockets. A metal coating on the gridwires and walls renders the thermoplastic grid conductive.

5 Claims, 5 Drawing Figures

U.S. Patent   Dec. 2, 1980   4,237,205
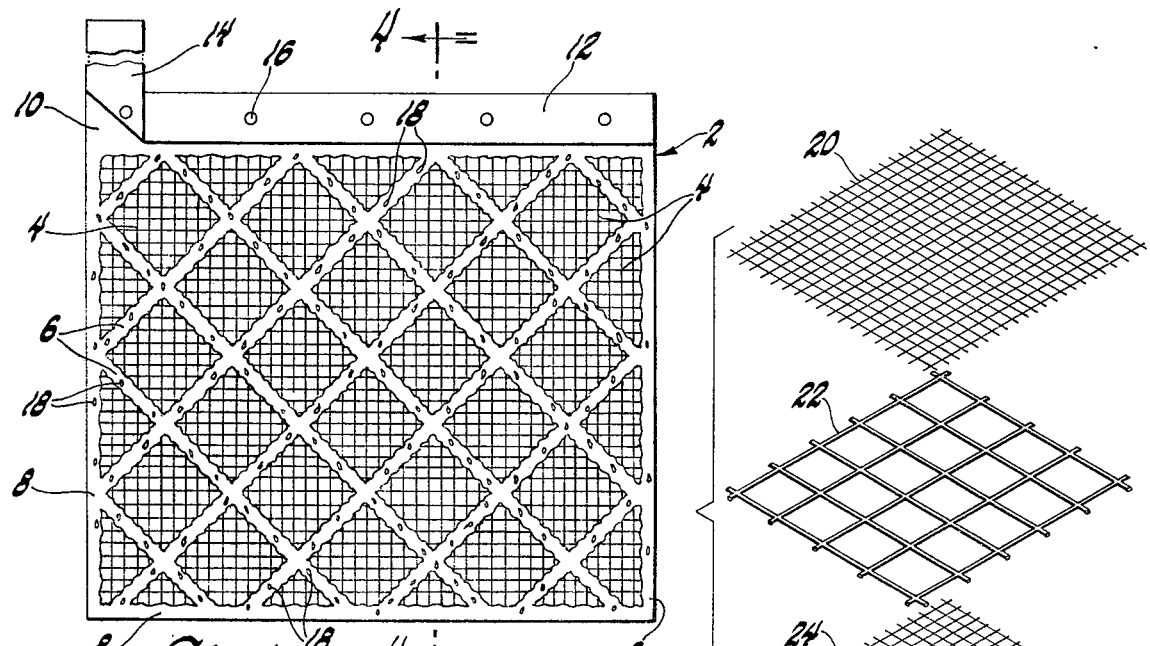
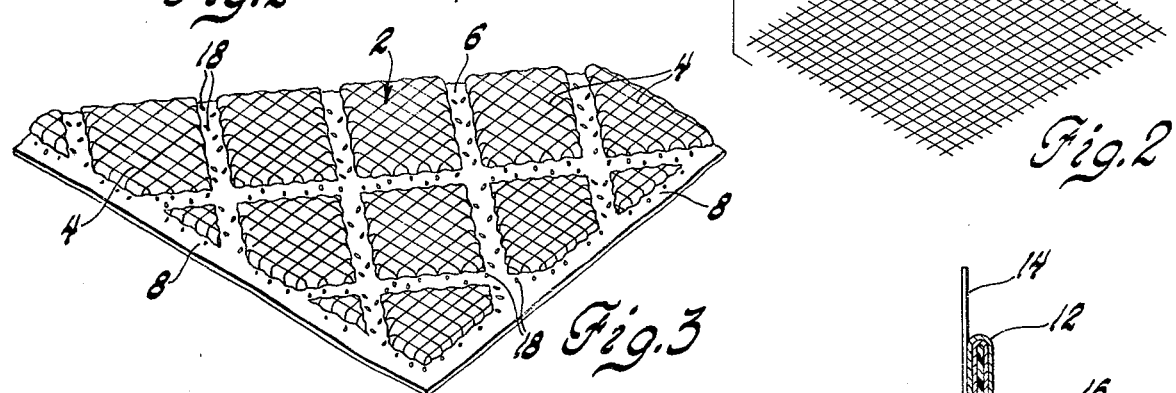
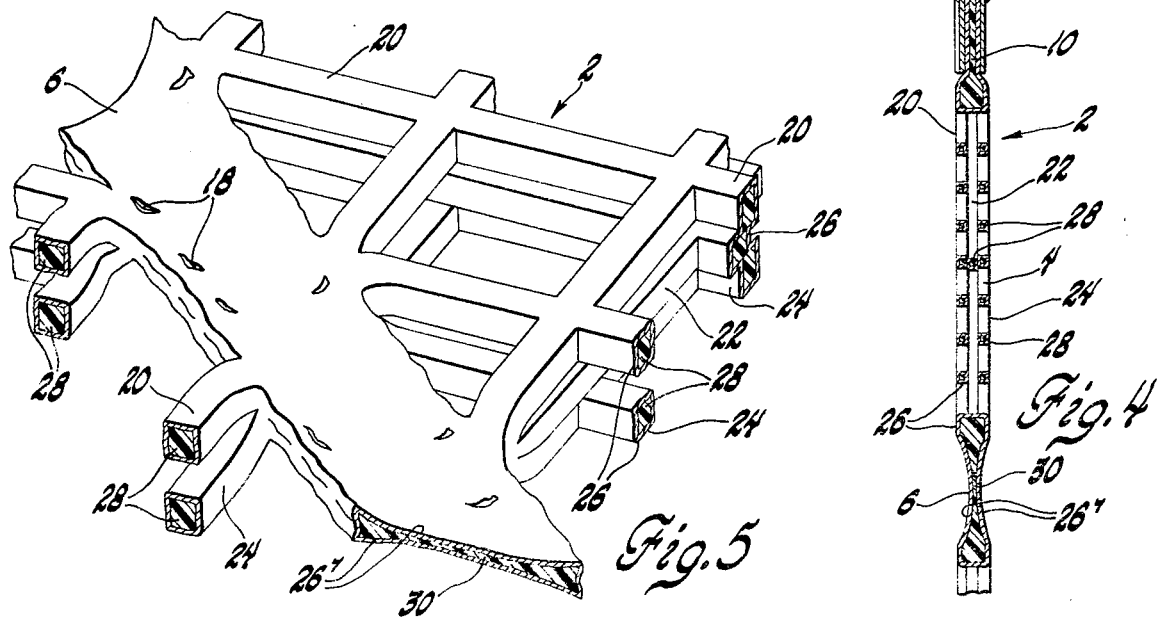

POCKET GRID FOR ALKALINE BATTERY PLATES

BACKGROUND OF THE INVENTION

The present invention relates to supporting grids for secondary alkaline storage battery plates of the pasted active material variety. Such plates have a meshwork grid supporting the active material and providing electrical conduction therethrough. The grid is pasted or filled with active material as by pressing, vacuum impregnation from a slurry, etc.

Alkaline batteries may have either soluble, insoluble, or both soluble and insoluble electrodes forming their electrochemical couple. The nickel-zinc battery, for example, contains both a soluble electrode (i.e., Zn) and an insoluble electrode (i.e., NiOOH). The zinc active material is electrolytically formed from zinc oxide which has previously been pasted onto a conductive supporting grid. The NiOOH active material is electrolytically formed from $Ni(OH)_2$ which has previously been pasted onto a conductive supporting grid.

Soluble electrodes dissolve in the electrolyte on discharge and must be recovered therefrom on recharge. The soluble zinc electrode, for example, discharges according to the following reaction:

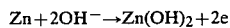
$$Zn + 2OH^- \rightarrow Zn(OH)_2 + 2e$$

The $ZnOH_2$ then dissolves in the electrolyte to form zincate ion, $[Zn(OH)_4^{--}]$, which saturates or precipitates out of the electrolyte (i.e., KOH). In the fully discharged state then, the grid and any residual unreacted zinc (i.e., about 30%) adhering thereto is suspended in an electrolyte-zincate slurry. In order to keep the dissolved zinc from migrating away from its associated grid and to prevent zinc dendrites from growing into contact with adjacent plates during recharge, the zinc electrode is enveloped in thin layers of microporous, separator material which is permeable to the KOH electrolyte but not to the zincate ion. On recharge, the zinc is recovered from the slurry by being electrolytically deposited back onto the grid and residual zinc according to the following reaction:

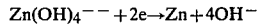
$$Zn(OH)_4^{--} + 2e \rightarrow Zn + 4OH^-$$

Ideally, the Zn will deposit on the zinc grid in a highly porous state for better electrolyte contact and will be distributed substantially uniformly across the face of the electrode to avoid the phenomenon known as "shape change." Shape change results from uneven deposition of the zince on the plate on succeeding charge and discharge cycles such that metal in the center of the plate becomes dense and nonreactive while that at the edges of the plate does not want to replate, but rather wants to migrate in the electrolyte. Shape change commonly occurs primarily in plates having large surface areas and uneven current distributions therethrough. Smaller plates with more even current distributions are not as susceptible to shape change as the larger plates.

It is an object of the present invention to provide a lightweight grid for soluble alkaline battery plates of the pasted type which grid promotes low current density dissolution and replating of the reactant resulting in a porous mass thereof substantially uniformly distributed across the face of the electrode throughout repeated charge-discharge cycles.

Insoluble pasted electrodes, on the other hand, have different problems than soluble ones. The insoluble NiOOH plates, for example, undergo a solid state reaction wherein the reactant changes from one solid form to another in situ, but without going into solution. This reaction is as follows:

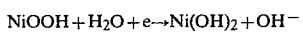
$$NiOOH + H_2O + e \rightarrow Ni(OH)_2 + OH^-$$

wherein protons from the electrolyte and electrons from the circuit move into the nickel oxide crystal lattice and restructure the nickel compound. This reaction is reversed on recharge. Expansion and contraction of the active material mass accompanies this solid state transition and severely stresses pasted plates having conventional monolayer grids. In this regard, the active material separates from the gridwires and often sheds from the plate and falls to the bottom of the cell. Breakage of the gridwires often occurs. All of these detrimental effects combine in time to reduce the performance of the plate. Moreover, NiOOH and $Ni(OH)_2$ compounds are poor conductors of electricity, and hence, costly and weighty inert conductive diluents (e.g., graphite or nickel powder) are typically added to the active material of pasted plates to effectively extend the conductivity of the grid throughout the active material.

It is another object of the present invention to provide a strong, lightweight grid for insoluble alkaline battery plates of the pasted type which grid will become intimately integrated with the active material to promote better retention of the active material, improved contact with the active material and improved electrical conductivity throughout the plate even at reduced conductive diluent loadings.

It is a still further object of the present invention to provide a method of making a laminated, metal-coated thermoplastic battery grid which is divided into a plurality of active-material-retention pockets bounded by conductive buses and including a plurality of grid wires extending throughout the pockets.

These and other objects and advantages of the present invention will become more readily apparent from the detailed description thereof which follows.

THE INVENTION

The invention comprehends a grid which is useful for both soluble and insoluble reactant, pasted-type electrodes and which is formed from at least two metal-coated thermoplastic gridwire networks (e.g., screen, expanded strip, punched sheet, etc.) bonded together so as to define a plurality of discrete pockets bounded by conductive buses. Each pocket includes a bundle of intersecting gridwires extending throughout the pocket for intimate integration with the active material therein and consequent uniform low current density distribution of current therethrough. The several pockets are physically isolated one from the other by a plurality of elongated channels formed in the faces of the grid. The pocket-defining channels result from welding (e.g., heat sealing) thermoplastic networks together along a number of lines across the face of the grid. The channels left by the welding/heat sealing operation are defined by thin walls of the thermoplastic from the networks which flows out from between the heat-sealing tools during the joining of the networks. A thin metal coating (e.g., sprayed, plated, etc.) covers the surfaces of the gridwires and the channel walls and serves to provide conductivity as well as increase the stiffness and dimensional stability of the grid. The coated walls of the pocket-defining channels effectively become electrical buses for distributing current substantially uniformly across the face of the grid as well as substantially uniformly within each pocket surrounded by the channels. In effect, then, there is formed a single lightweight grid of large dimension, but which has a current distribution capability akin to dimensionally smaller plates. This more uniform current distribution is seen to reduce the otherwise common effect of "shape change" resulting from uneven current distributions across the face of a plate.

A current-collecting header having a lug projecting therefrom is then affixed to one of the borders of the grid. In the alternative, only a lug need be attached to the metal coated grid. The lug serves to connect the plate with other like plates in the cell assembly group. Next, the grid is pasted or filled with active material. In this operation, the active material is admixed with an appropriate binder and packed into the grid. This pasting may be accomplished by any of the conventional pasting techniques known in the art including, but not limited to, belt pasting, roller nip pasting, vacuum slurry pasting, etc. In addition to the active material and binder, conductive diluents and/or reinforcing fibers may be added to the paste as needed.

Intimate integration of the gridwires with the active material in the small gridwire pockets serves to hold insoluble active materials in place and in continual electrical contact with the gridwires during the expansion and contraction it undergoes during cycling. Shedding is reduced and performance improved. Moreover, the strength and multiple criss-crossing of the many gridwires in the laminated structure minimizes gridwire breakage, but in any event does not result in any significant disruption in the conductive paths into and through the gridwire bundle of the pocket. Still further, the intimate integration of gridwires and soluble active material in the small gridwire pockets results in lower current density (i.e., relative to the gridwires) replating of the active material (e.g., zinc) with minimal interfering polarizing effects and consequently a more uniform deposition thereof throughout each pocket.

A preferred embodiment of the invention includes a laminate of at least three thermoplastic networks of expanded carbon-filled polypropylene. The inner layer(s) is/are sandwiched between two outer layers and preferably has a larger mesh and wire size than the outer layers. The coarser inner layer(s) spaces the finer outer layers apart thereby providing more active material capacity within each pocket. The finer outer layers serve to better contain the active material within the voids of the coarser inner layer(s). A particularly preferred embodiment includes a single inner layer having mesh openings of about ¼ inch×3/16 inch sandwiched between two outer layers having mesh openings of about 1/16 inch×1/16 inch. The three networks are welded together along the edges thereof and in a crisscross pattern across the face thereof in a pattern which yields active material mesh pockets of about 1 inch×1 inch square. The metal coatings applied to the plastic grid will vary in both composition and thickness depending on the particular electrode under construction. Grids have been prepared by electroplating the laminated network in a Watts nickel bath to a thickness of about 0.0015 inches. The plate lug is attached and the grid pasted by the vacuum slurry dewatering process leaving the active material (e.g., NiOOH) residue within the interstices of the pockets.

DETAILED DESCRIPTION OF THE DRAWINGS

The invention may still better be understood in the context of the following description of one embodiment thereof which is described in conjunction with the drawings in which:

FIG. 1 is a front elevational view of a grid according to the present invention;

FIG. 2 is an exploded perspective view of the essential components of the grid prior to assembly;

FIG. 3 is an enlarged perspective view illustrating a corner of a grid according to the present invention;

FIG. 4 is a sectioned side elevational view of the grid taken in the direction 4—4 of FIG. 1; and FIG. 5 illustrates a magnified perspective section of a segment of a grid according to the present invention.

The figures depict a grid 2 having a plurality of paste-retaining pockets 4 on the surface thereof which pockets are defined by a plurality of elongated channels or grooves 6 formed in the faces of the grid 2 during the lamina welding operation. The grid 2 is defined by a border 8 which, like the channels 6, is formed at the time the several laminae are heat heat sealed/welded together. A wide heat sealed band 10 is formed along the top of the grid and serves to receive a current-collecting bus bar 12. The bus bar 12 carries a folded over lug 14 for joining the plate to like plates in a cell group and is affixed to the grid by rivets or eyelets 16.

FIG. 2 depicts an exploded view of a stack of three thermoplastic networks (e.g., screens) 20,22,24 prior to welding into the laminated grid 2. Heat sealing the thermoplastic networks is most conventinally accompanied by squeezing the zones to be fused together between heated tools which cause the thermoplastic to melt, flow together, exude from between the tools, and finally resolidify to form the weld. The welding tools form a depression or channel 6 in the faces of the grid 2. The shape of the channel 6 will vary with the precise shape of the welding tools. The welding tool causes plastic from the networks 20,22 and 24 to fuse together and squeeze out as flash from between the tools to form a very thin wall 30 which defines the channel 6. Ultrasonics may also be used to effect the welding. The welding produces a plurality of discontinuities 18 in the walls 30 where the plastic from the gridwires does not flow together. FIG. 3 is a perspective view of one corner of the grid 2 and illustrates more demonstratively the general nature, character and appearance of the laminations following welding.

FIGS. 4 and 5 illustrate the relationship between inner screen 22 and outer screens 20 and 24 as well as the encapsulating metal coating 26 on the surfaces of the gridwires 28, the channel wall 30 and band 10. The metal coating 26' deposited on the walls 30 of the channel 6 acts as a current bus for distributing the current from the lug 14 and header bus 12 substantially uniformly (i.e., with minimal IR drop) across the face of the grid 2 and around each of the pockets 4. The center of each pocket 4 is only a short distance from the current buses that surround it. Hence, current is substantially uniformly distributed within each pocket 4 as well as across the face of the grid.

While the invention has been disclosed primarily in terms of certain specific embodiments thereof, it is not intended to be limited thereto but rather only to the extent set forth in the claims which follow.

The embodiments of the invention in which an exclusive property or privilege is claimed are defined as follows:

1. A laminated grid for supporting the active material of pasted alkaline storage battery plates comprising:
   at least two thermoplastic networks forming the principal faces of the grid and comprising a plurality of intersecting gridwires defining openings therebetween;
   a plurality of elongated welds extending as narrow channels across said faces and bonding said networks together, said channels being defined by walls formed by the fusion and exudation of said thermoplastic from said networks at said welds and serving to divide said networks into a plurality of gridwire pockets; and
   a metal coating on said gridwires and walls sufficient to distribute battery current substantially uniformly across said faces and throughout said active material.

2. A laminated grid for supporting the active material of pasted alkaline storage battery plates comprising:
   at least two thermoplastic networks forming the principal faces of the grid and comprising a plurality of intersecting gridwires defining openings therebetween;
   a plurality of elongated intersecting welds extending as narrow channels in criss-cross fashion across said faces and bonding said networks together, said channels being defined by walls formed by the fusion and exudation of said thermoplastic from said networks at said welds and serving to divide said networks into a plurality of substantially symmetrical gridwire pockets; and a metal coating on said gridwires and walls sufficient to distribute battery current substantially uniformly across said faces and throughout said active material.

3. A laminated grid for supporting the active material of pasted alkaline storage battery plates comprising:
   two thermoplastic networks forming the outermost layers and principal faces of the grid and comprising a plurality of intersecting gridwires defining openings therebetween;
   at least one thermoplastic inner network sandwiched between said outer networks and comprising a plurality of intersecting gridwires;
   a plurality of elongated welds extending as narrow channels across said faces and bonding said networks together, said channels being defined by walls formed by the fusion and exudation of said thermoplastic from said networks at said welds and serving to divide said networks into a plurality of gridwire pockets; and
   a metal coating on said gridwires and walls sufficient to distribute battery current substantially uniformly across said faces and throughout said active material.

4. A laminated grid for supporting the active material of pasted alkaline storage battery plates thereof comprising:
   two thermoplastic networks forming the outermost layers and principal faces of the grid and comprising a plurality of intersecting gridwires defining a first mesh-size; at least one thermoplastic inner network sandwiched between said outer networks and comprising a plurality of intersecting gridwires defining a second mesh-size greater than said first mesh-size;
   a plurality of elongated welds extending as narrow channels across said faces and bonding said networks together, said channels being defined by walls formed by the fusion and exudation of said thermoplastic from said networks at said welds and serving to divide said networks into a plurality of gridwire pockets; and
   a metal coating on said gridwires and walls sufficient to distribute battery current substantially uniformly across said faces and throughout said active material.

5. A laminated grid for supporting the active material of pasted alkaline storage battery plates, thereof comprising:
   two thermoplastic networks forming the outermost layers and principal faces of the grid and comprising a plurality of intersecting gridwires defining openings therebetween;
   at least one thermoplastic inner network sandwiched between said outer networks and comprising a plurality of intersecting gridwires defining openings therebetween;
   a plurality of elongated intersecting welds extending as narrow channels in criss-cross fashion across said faces and bonding said networks together, said channels being defined by walls formed by the fusion and exudation of said thermoplastic from said networks at said welds and serving to divide said networks into a plurality of substantially symmetrical gridwire pockets; and a metal coating on said gridwires and walls sufficient to distribute battery current substantially uniformly across said faces and throughout said active material.

* * * * *